Dec. 9, 1924.

W. H. BOUTELLE

EYE PROTECTOR

Filed Sept. 15, 1923

1,518,385

INVENTOR
WILLIAM H. BOUTELLE.
BY
Harry H. Styll.
ATTORNEY

Patented Dec. 9, 1924.

1,518,385

UNITED STATES PATENT OFFICE.

WILLIAM H. BOUTELLE, OF STURBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE PROTECTOR.

Application filed September 15, 1923. Serial No. 662,929.

*To all whom it may concern:*

Be it known that I, WILLIAM H. BOUTELLE, a citizen of the United States, residing at Sturbridge, in the county of Worcester and State of Massachusetts, have invented certain new and useful Improvements in Eye Protectors, of which the following is a specification.

This invention relates to improvements in eye protectors or goggles, and has particular reference to a type of goggle wherein the lens or lenses may be removed and replaced very easily and readily thereby increasing the life of the goggle.

Heretofore goggles of similar nature have been constructed of a fiber or the like, and the lens has been so seated that to remove the same when desired it became necessary to heat the fiber cup in hot water until the fiber was pliable enough to pry away from the lens, whereupon a new lens was substituted and the old fiber pressed and formed back into its original shape. As this was an extremely tedious and expensive operation oftentimes the entire goggle would be discarded and new ones bought instead of changing the lenses as can be done with the present invention.

A very important object of this invention is to provide a goggle wherein the lens or lenses are so arranged within the cup that when one or more become broken or for any reason it is desired to change the form of lens, the retaining means may be removed and the lenses changed.

Other and very important objects of the invention will become apparent during the course of the following description.

In the drawings, wherein like numerals are employed to designate like parts throughout the same:

Figure 1:
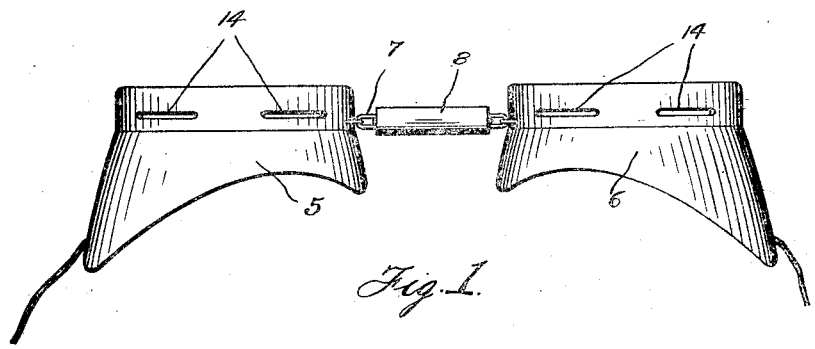
Figure 1 is a side elevation of a pair of goggles made in accordance with my invention.

In the drawings, wherein for the purpose of illustration is shown a preferred embodiment of my invention, the numerals 5 and 6 designate the cup portions of the goggle which are connected by means of a chain 7 having a suitable flexible covering 8 constituting a bridge portion.

Figure 2:
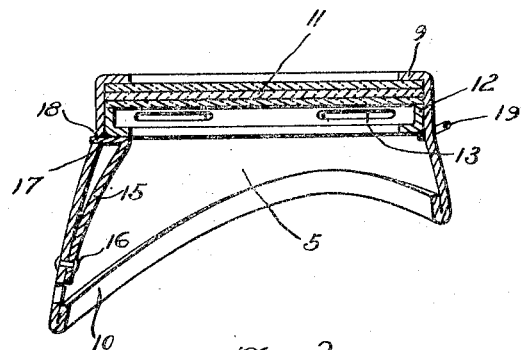
Figure 2 is a central longitudinal section through one of the cups thereof.

As can be seen in figure 2 of the drawings, the cups 5 and 6 are formed from a fiber or similar material having an inturned flange 9 at the top thereof and a rolled over edge 10 at the opposite edge thereof. Of course, the portion 10 is formed to fit the curvature of the face of the user, while the flange 9 is of sufficient width to form an adequate seat for the lenses when in position, but which on the other hand is not so wide as to constitute an obstruction to the view of the user.

Figure 3:
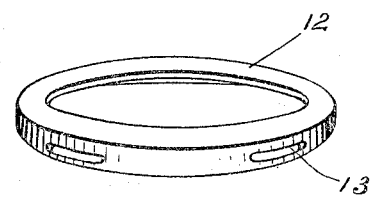
Figure 3 is one form of retaining means that may be employed.

Suitable lenses which may be of any desired number and designated by the numeral 11, are placed within the cup when the cup is in an inverted position, whereby they will rest on the inturned flange 9. It is, of course, to be understood that any form of lens or lenses may be used to accommodate the goggles to the various purposes for which such goggles are designed. A ring 12 L-shaped in cross section, such as is shown in Figure 3, having spaced elongated openings 13, is placed within the cup, as is illustrated in Figure 2 of the drawings. The elongated openings 13 are adapted to register with similar openings 14 formed in the cup for the purpose of ventilation, thus if it is desired doing away with the usual perforations made in the cup, although they may be had if required.

Arranged on the interior of the cup is a spring 15 fastened therein near its lower extremity by means of the rivet 16, being so arranged that it has a tendency to spring toward the center of the cup. The upper end thereof terminates in an angular extension 17, which is so bent as to lie in a plane substantially parallel to the lenses 11. The angular extension 17 is slidable through the slot 18 cut in the side of the cup. It is to be noted that the angular extension 17 bears against the ring 12 so as to urge the same toward the lenses 11, thereby holding the lenses in contact with the inturned flange 9. One side of the ring is engaged by the end link 19 of the bridge chain 7.

Figure 4:
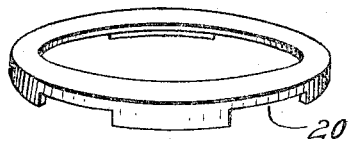
Figure 4 is a modification thereof.

As is shown in Figure 4 of the drawings, a ring may be used having the cut out portions 20 instead of the elongated openings 13 which, of course, when used will likewise register with the elongated openings 14 of the cup.

When in use the cup is inverted and suitable lenses placed therein so as to seat on the inturned flange, whereby the ring 12 may be placed within the cup directly next to the lenses. Of course, to force the ring 12 into position the spring member 15 must be forced against the side of the cup, and upon release of the pressure thereupon the spring will immediately go into its original position thereby engaging the ring 12 and preventing its displacement. Care should be exercised in aligning the elongated openings 13 and 14 of the ring and goggle, respectively, so that the proper ventilation will be maintained when the goggle is in use. When for any reason it is desired to remove the lenses 11 the spring member 15 is retracted and the ring 12 may be removed, thereby allowing the easy removal of the lenses 11 as will be readily understood.

It is to be understood that the form of my invention herewith shown and described is to be taken as the preferred embodiment of the same, and that various changes in the shape, size and arrangement of parts may be resorted to without departing from the spirit of my invention or the scope of the subjoined claims.

Having thus described my invention, what I claim as new is:

1. An eye protector or goggle of the class described, comprising a cup having a rolled edge at one end thereof and an inturned flange at the opposite end thereof, a lens positioned within the cup, and contacting with the inturned flange, a ring substantially L-shaped in cross section placed against the lens, and spring means contacting with said L-shaped ring.

2. In a device of the character described, comprising a cup having a frontal inturned flange and a side shield having an opening, a lens in the cup and resting on the flange, a flanged ring in the cup having one edge engaging the inner face of the lens and a flange extending into the cup and a spring having one end secured in the cup near its rear edge, having a bent portion extending through the opening in the shield and engaging the flanged ring to hold it in place against the lens.

3. In a device of the character described, comprising an eye cup having a frontal portion with an inturned flange and a series of openings, a side shield having an opening, a lens in the cup and resting on the flange, a flanged ring having a series of openings placed in the cup so that its openings overlie the openings in the frontal portion of the eye cup, so that one edge will engage the inner face of the lens and the flange will extend into the cup, and a spring having one end secured in the cup near its rear edge and having a bent portion extending in the opening in the shield and engaging the flanged ring to hold it in place against the lens.

4. In a device of the character described, comprising an eye cup having a frontal portion with an inturned flange and a series of openings, a side shield having an opening, a lens in the cup resting on the flange, a flanged ring in the cup having one edge engaging the inner face of the lens and a flange extending into the cup, a spring having one end secured in the cup near its rear edge and having a bent portion extending through the opening in the shield and engaging the flanged ring to hold it in place against the lens, and a rolled over portion forming the contour edge of the shield.

WILLIAM H. BOUTELLE.